March 1, 1949.  W. E. SCOTT  2,463,321

CIRCUIT FOR EVALUATING CELLS

Original Filed July 25, 1942  4 Sheets-Sheet 1

INVENTOR.
William Edwin Scott
BY
Walter C. Wheeler
ATTORNEY

INVENTOR.
William Edwin Scott
BY
Walter C. Wheeler
ATTORNEY

March 1, 1949. W. E. SCOTT 2,463,321
CIRCUIT FOR EVALUATING CELLS
Original Filed July 25, 1942 4 Sheets-Sheet 4

INVENTOR.
*William Edwin Scott*
BY
*Walter C. Wheeler*
ATTORNEY

Patented Mar. 1, 1949

2,463,321

UNITED STATES PATENT OFFICE 2,463,321

CIRCUIT FOR EVALUATING CELLS

William Edwin Scott, Drexel Hill, Pa., assignor to E. I. du Pont de Nemours & Company, Wilmington, Del., a corporation of Delaware Original application July 25, 1942, Serial No. 452,325. Divided and this application March 19, 1946, Serial No. 655,464

5 Claims. (Cl. 250—41.5)

This invention relates to an improvement in means for accurately evaluating the output of current sources such as the output of photoelectric cells, and it has special significance in goniophotometry for accurately evaluating the output of photoelectric cells which are responsive to light reflected from given surfaces. In devices for evaluating reflectance, a suitable light from a collimator may be projected onto the sample to be tested and the reflected light received by a receptor which directs the reflected light onto a measuring photoelectric cell. The output of this cell may be compared with the output of a compensating photoelectric cell which is activated by a constant or standard of illumination. Thus accurate evaluation of the reflectance depends in part on accurate evaluation of the output of the photoelectric cells. More particularly, this invention relates to an improved circuit which is capable of evaluating the output of such cells accurately and in proportion to the true reflectance of the sample being tested.

In a circuit hitherto used for evaluating such conditions in goniophotometric devices, the photoelectric cells were connected in a simple arrangement of what is known as an opposing parallel arrangement (Fig. 6). The circuit was provided with a zero center galvanometer and a slide wire potentiometer in which the terminals of a measuring cell were connected in parallel with the zero center galvanometer and with the fixed ends of a slide wire potentiometer. One terminal of this photoelectric cell was connected to the terminal of opposite polarity of a compensating cell. Then the opposite terminal of compensating cell was connected to the variable contact of the slide wire potentiometer such as the arrangements shown in U. S. P. 2,064,517. A scale indicating displacement or relative position of the variable contact member was supposed to be proportional to a change in output of the measuring cell, but this contrivance did not give an accurate evaluation because it did not take into account the small change in resistance of the external circuit of the cell in which the output was not changed by the standard of illumination. Thus a small error was introduced into the measurement which was material when small differences in output were involved, such as a change due to the difference in reflectance between a standard surface and a surface which was tested for relative reflectance. Such error might be a large proportion of the difference being estimated.

In order to eliminate errors due to such inherent defects in the devices, I provide an external resistance in the measuring cell circuit which is varied with variations of resistance in the resistor of the slide wire potentiometer in that circuit. The device is arranged so that the resistance in the external resistor is changed in the same amount as the resistance in the slide wire potentiometer is changed, but when the resistance in one is increased, the resistance in the other is decreased so that the total resistance remains constant. This variable resistance element external to the potentiometer, as will appear in the following more detailed description, is a resistance similar to the resistance within the potentiometer and in the same circuit. When the potentiometer is adjusted to a new position which is necessary for balancing the output of the cells when a new output of one of the cells is affected by reason of a change in the light reflected from the sample being tested over that reflected from the standard, then the only change indicated by the displacement of the measuring device is a change which bears a true proportion to the change in reflectance from the standard and to the change in output of the cell which receives the same.

The invention will be described with reference to an embodiment of the principles involved which are shown and described in my copending application Serial Number 452,325 filed July 25, 1942 (Patent No. 2,406,166, August 20, 1946), of which this is a division. In the drawings constituting a part hereof Fig. 1 is a perspective view of a goniophotometer case showing the scales and manipulative devices in the front side thereof;

Fig. 2 is a view in perspective of the main optical working parts of the goniophotometer showing the collimator and receptor each with its photoelectric cell mounted thereon, both in turn being mounted on an arcuate supporting frame or bed plate which is attached to a frame member having an aperture therein facing the collimator and receptor, and in position for receiving the sample to be tested in proper relationship to these elements;

Figure 2:
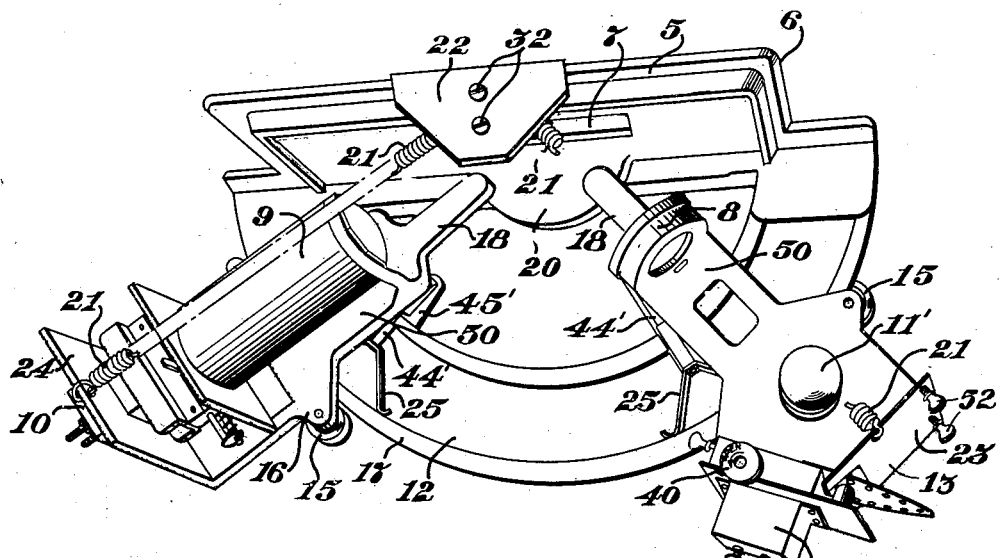
Figure 1:
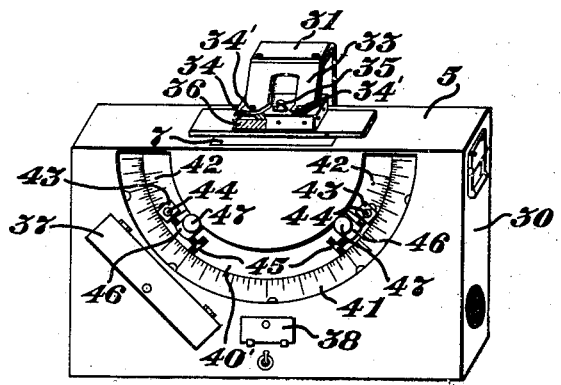

Referring to Figs. 1 and 2, a base or support member 5 having a plain surface 6, upon which or against which the sample to be tested is disposed, has an opening or window 7 therethrough. The portion of the surface to be tested for reflectance is exposed to the light through opening 7 in the plane 6 of the base 5, said light being projected thereon from the collimator 8. The light reflected from the sample is received by the receptor 9 which transmits it in turn to a photoelectric cell 10 designated herein as the measuring cell. With a given value of incident light projected by the collimator, it is evident that the output of the measuring cell 10 will vary in response to the different amounts of light reflected from samples having different reflectances, and that the variation in the output of the cell 10 is dependent upon the relative reflectance value of the surfaces tested. The collimator 8 carries photoelectric cell 11, which is designated herein as the compensating cell. This cell receives a given regulated illumination from a source of light 11 in a manner hereinafter to be described.

The collimator 8 and the receptor 9 are mounted with their axes radially disposed to a point in the surface to be tested and with their axes in a plane parallel to the plane of an arcuate bed plate 12 or track member and perpendicular to the surface 6. The arcuate bed plate 12 extends on one side of the frame member 5 in a plane perpendicular to the surface 6 of the frame member upon which the surface to be tested is disposed. The mountings for the collimator and receptor are arranged so that their centers of rotation, as they travel with their axes radially disposed along the arcuate track, are at a point in the plane 6 which is within the aperture 7 wherein the sample to be tested is exposed to the light.

Figures 3, 4:
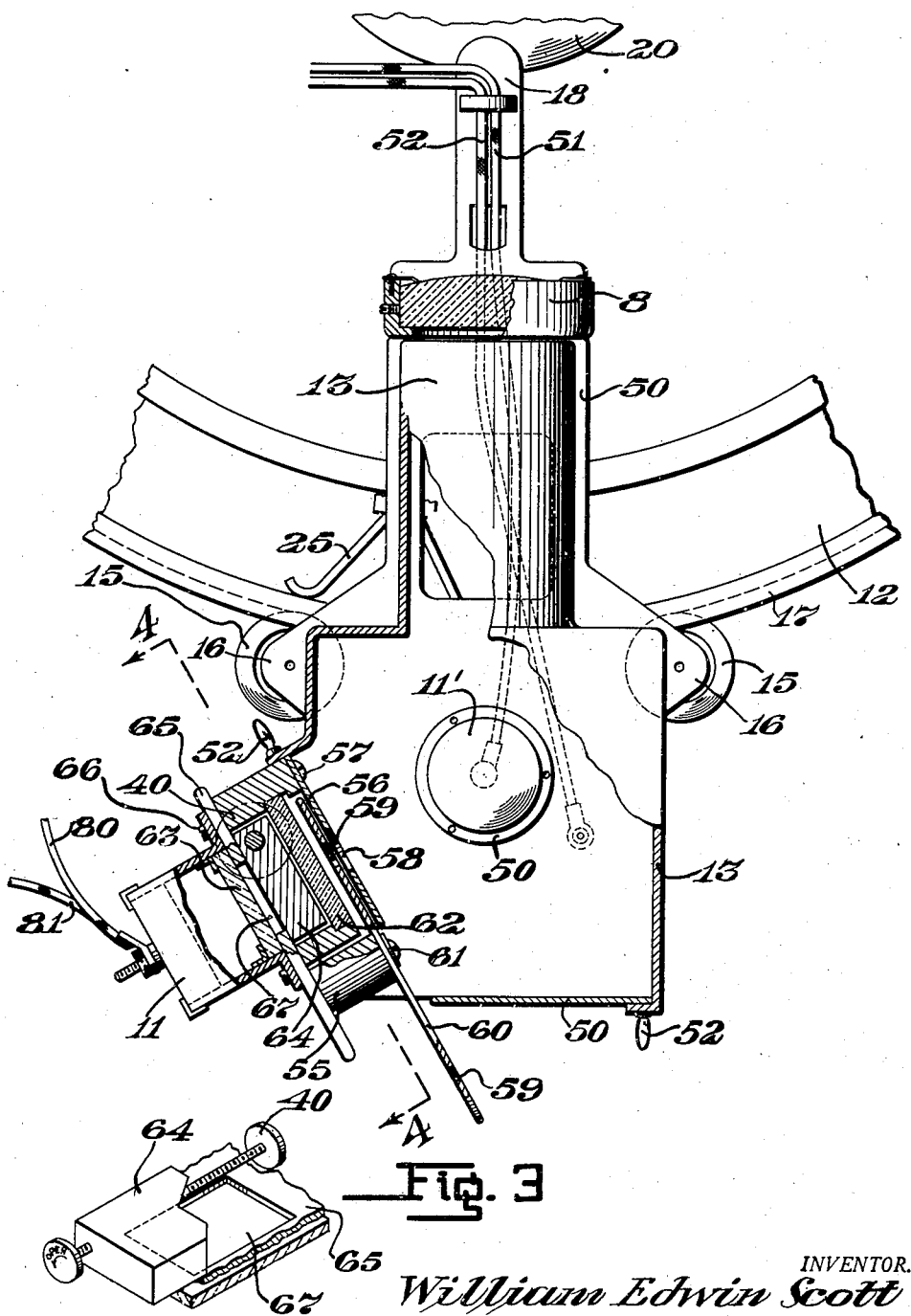
Fig. 3 is a rear elevational view of the collimator and parts of the adjusting mechanism for the compensating cell and shown with parts broken away and other parts in section.
Fig. 4 is a cross sectional view taken along the line 4—4 of Fig. 3 showing the adjusting mechanism more in detail.

The light source 11' mounted on the bed plate 50 of the collimator is enclosed in a light tight housing 13 (Fig. 3). Over an opening in the rear portion of the housing 13, the compensating photoelectric cell 11 and a device for regulating the admission of light to the cell from the light source are mounted. Suitable electrical connections 51 and 52 are provided for supplying power to the light source 11'. The power supply to the light source is preferably one which does not vary greatly, but it may be one which is not absolutely constant provided that it maintains a proper voltage on the light source corresponding to the desired color temperature of the light source, such as I. C. I. Illuminant A. Small variations in this light, which may occur from day to day in the color temperature, are not serious. From the following more detailed description it will also be observed that both the compensating and the measuring photoelectric cells are illuminated from one and the same source, and their outputs are balanced against each other in making measurements of the difference between the reflectance of the sample and that of a standard. With the arrangement here provided, small variations in light intensity do not materially affect the null or balance point in making reflectance measurements on different days.

The arrangement for supporting the collimator and receptor in proper disposition on the arcuate bed plate 12 provides for restraining movement in five directions or points of movement, and permits freedom of movement in one direction. Rollers (Figs. 3 and 4) on the arms 16 which are attached to the closed housings of the collimator and receptor roll in a flanged arcuate guide or track 17 which is integral with the outside edge of bed 12. Supports 18 at the inner ends of the collimator and receptor mountings are adapted to slide on a semicircular extension or table 20 which comprises an integral part of the frame or base member 5. The sliding contact surface of table 20 is perpendicular to the facing 6 of base member 5 and it extends from the same side of the base member as the arcuate track 12. The ends of springs 21 hook or attach to parts 22 of the base 5 and the other ends attach to parts 23 and 24 of the collimator and receptor supports for holding these members on and against the support 20 and the arcuate track 17. Thus arcuate movement of the collimator and receptor along the track and about their common center of rotation is permitted whilst the radial disposition of the parts is maintained. Spring guides 25, which are mounted on the collimator and receptor supports 50, are arranged to bear outwardly on the upper side of the arcuate flange 17 as additional guides to prevent accidental or unintended movement of the receptor and collimator when these parts are not locked in place.

Thus the collimator and receptor arms may move in an arc in a plane perpendicular to the plane 6 of the support 5, the center of which is located in the exposed face of the sample to be tested which extends across the aperture 7 of the frame 5. The coil springs 21 urge each of the rollers 15 in a direction such that they have a centripetal, as well as a lateral pressure on the track 17 and its outside radial flange. The rollers therefore provide four of the five guiding contacts, the fifth being between the extensions 18 of the collimator and receptor and the inner sliding support or table 20.

In mounting the device in the casing 30 (Fig. 1), the bed plate 5 is secured to the upper part of the casing. The top of the casing and the surface 6 of the bed plate 5 are substantially flush with each other. The aperture 7 through the sample supporting portion of the frame 5 permits the light projected from the collimator 8 to illuminate the sample and to be reflected into the receptor 9.

A sample holder on the casing 30 may be provided. This holder comprises an angle piece or bracket 31 attached to the back member 22 of the frame member 5 by screws 32. A yieldable spring steel strip 33 supports a block 34 to which the projecting fingers of the spring 33 are connected by rivets 34'. A knurled knob 35 secured to the top of the block 34 serves as a finger grip for raising the block against the spring 33 to mount the sample. For convenience, the lower surface of the block 34 may be fitted with a piece of black plate glass 36 or other suitable material to be used as a standard for relative measurements and the sample to be tested may be inserted underneath the glass plate.

Hinged doors 37 and 38 in the front wall of casing 30 provide access to the adjusting knobs 40 (Figs. 3 and 4) and other adjusting mechanisms mounted on the end of the collimator. A large door, not shown, is provided in the rear wall of the casing 30 for providing access generally to the interior of the casing.

Figure 10:
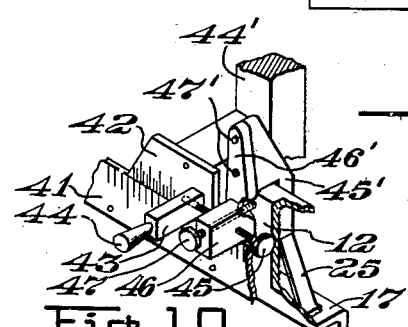
Fig. 10 is a fragmentary front elevational view view showing details of the supports and measuring arrangement.

Through the front panel of the housing 30, an arcuate slot 40' is provided in which is presented an arcuate plate 41 (Fig. 10) which is marked off in equal divisions. The plate 41 is attached to the front of the arcuate base member 12. Small vernier plates 42 concentric with the arcuate plate 41 which operate with and are attached to the collimator and receptor mountings, respectively, are also visible and accessible through the arcuate slot 40'. The vernier plates 42 carry posts 43 (Figs. 1 and 10) terminating in knobs 44. For approximate angular adjustment of the collimator and receptor, the arms 44' of the collimator and receptor supports and the attached receptor and collimator are moved to various positions on the track 17 by means of the knobs 44 which project outside of the housing. Vernier screws 45 are threaded through blocks 46 and into posts 43, and locking screws 47 threaded in and passing through blocks 46 bear on the front facing of arcuate bed 12 for locking the collimator and receptor carriages when the collimator and receptor are placed in approximately accurate angular disposition to each other. These vernier screws 45 operate on blocks 46 and posts 43 to retain the parts in the desired location. The parts of these clamping and adjusting devices are arranged in reverse position to each other on the collimator and receptor carriages; that is, they are arranged as mirror images of each other.

The clamping device comprises a back piece 45' (Fig. 10) which carries the guide springs 25 bearing on the flange on the back side of the bed 12 and it extends around the inner arcuate edge of bed 12 where the plate 46' is attached by screws 47'. Plate 46' extends along the front side of the arcuate plate 12. The post or block 46 is mounted integrally with the plate 46' and a locking screw 47 is threaded in the block 46 and in locking position it bears at its inner end on the bed plate 12. The vernier screw 45 is also threadably mounted in the block 46 in a transverse direction to the locking screw 47 and it is rotatably secured at the end into the block 43 which is integrally mounted on the vernier scale 42. In operation, the collimator and receptor are roughly adjusted to the proper angular disposition by means of the knob 44. The locking screw 47 is then tightened onto the bed plate 12. Thereafter accurate angular adjustment is secured by manipulating the vernier screw 45. The collimator frame 50 carries the lamp 11' (Fig. 3) and suitable leads 51 and 52 are connected to a suitable source of power. Over an opening in the rear part of the housing 13 of the collimator is mounted the assembly comprising the compensating cell 11 and the cover plate 23. The latter is suitably secured to the housing by thumb screws 52.

The mounting for the cell 11 comprises a means for adjusting the amount of light admitted directly to the compensating cell from the source of light 11'. The adjusting means comprises a housing 55 carrying an apertured plate 56 which is attached to the inner surface thereof by the screws 57. The plate 56 has a circular opening 58 which is centered in the line extending from the source of light and normal to the face of the photoelectric cell 11. Circular openings 59 of various sizes and smaller than opening 58 are centered between the plate 56 and the cell 11 along the same line as opening 58, by mounting a rotatable disc 60 on the frame 55 by means of the screw 61 so that the various sizes of openings may be brought between the large circular aperture 58 and the photoelectric cell 11 by rotating the disc on the central or axial screw 61. Interposed in the casing 55 between the rotatable disc 60 and the cell 11 is a heat absorbing unit 62 which may desirably be composed of a blue heat absorbing glass. Interposed between the heat absorbing glass 62 and cell 11 is a suitable diffusing screen 63 which may be a piece of ground plate glass mounted normal to the line passing through the apertures. In order further to regulate the light admitted to the compensating cell 11, a slide 64 is provided in the space between the ground glass 63 and the heat absorber 62. This regulator comprises a bed plate 65 fixed to the frame 55 by screws 66. The bed plate has a rectangular opening 67 therethrough. The slide 64 is preferably provided with a diagonally extending edge for masking the opening 67 in the bed plate 65 as the slide is advanced across the opening by means of the adjusting screw 40 which is mounted on the frame 55 and threadably engages the slide.

In operation, the direct light shed from the light source 11' upon the compensating cell can be cut down to a value such that the output of the compensating cell balances the output of the measuring cell 10. The compensating cell 10 on the receptor is activated by the light reflected from a standard reflectance piece to which the sample to be tested is referred. The output of the compensating cell 11 is first balanced against the output of the measuring cell 10 when the standard of reflectance, say a black piece of plate glass, is mounted in the aperture 7. The balancing of the circuit is done by manipulating the decade resistance hereinafter to be described. The surface to be tested for reflectance is then substituted for the standard of reflectance and the outputs of the cells are again balanced. By noting the difference in adjustment indicated on the resistance unit when these different outputs of the cells are balanced, an evaluation of the difference in reflectance is shown between the sample and the standard to which the piece to be tested is referred.

Figure 5:
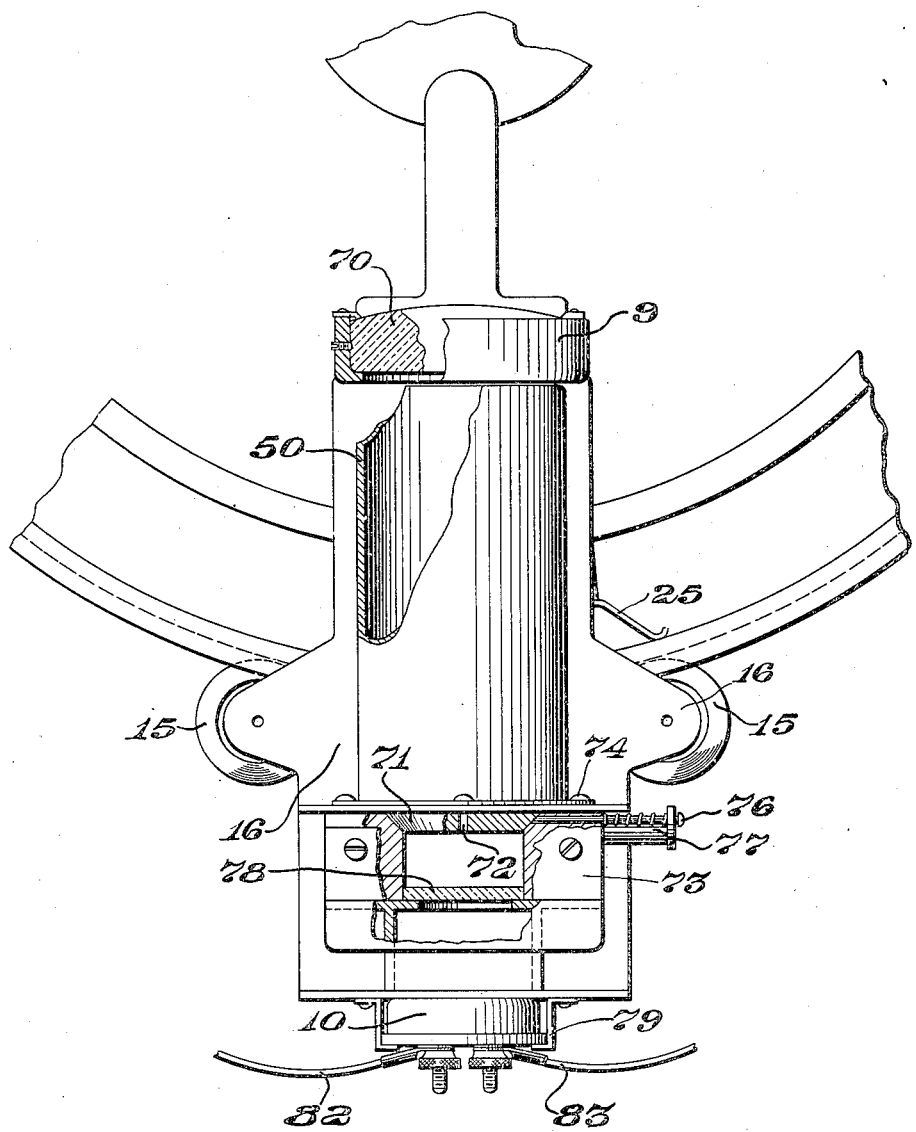
Fig. 5 is a rear elevational view of the receptor and its photoelectric cell with parts broken away.

The receptor 9 (Fig. 5) is also provided with light regulating means in front of the measuring cell 10 which is located at the rear of the receptor. At the focal point of the receptor collimator lens 70 is an adjustable plate 71 having a slit 72 which is disposed at the focal point of the receptor collector lens. The plate 71 extends diametrically across the end of the receptor 2. The plate 71 is arranged to slide in a frame 73 which is mounted on the end of the receptor 2 by means of screws 74. The slit 72 in slide 71 is properly positioned by means of an adjustable spring press pin 76 which bears against an end plate on the bracket 77 which is an integral projection of the housing. Between the plate 71 and the measuring cell 10, a ground glass 78 is mounted normal to the axis of the receptor for disseminating the light which passes through the slit. The photoelectric cell 10 is then mounted at the end of the housing and held in place by brackets 79 and with its face normal to the axis of the receptor.

Figures 6, 7:
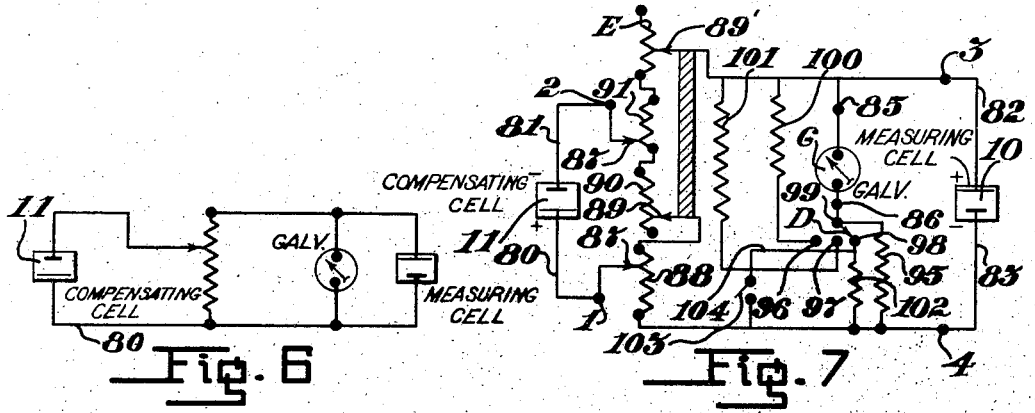
Fig. 6 is a wiring diagram showing, in general, the type of circuit employed.
Fig. 7 is a conventional wiring diagram of the circuit showing two photoelectric cells connected in opposing parallel arrangement with a slide wire potentiometer and an external compensating resistance in the circuit of one of the cells.

The negative side of compensating cell 11 on the receptor is connected through lead 81 to post 2 of the decade resistance and the positive side of this cell is connected to post 1 through connector 80. By manipulating the knob A on the panel of the decade resistance unit, the movable contactor puts more or less of the resistor 88 into this circuit as connector point 87 (Fig. 7) moves along the resistor 91. The resistor is proportioned so that this variation amounts to 10 ohms for each position of knob A. Unit resistances are put into the circuit by manipulating knob B on the panel, whereby more or less of the resistor 91 is entered into the compensating cell circuit as contact point 87 moves along the resistor. The changes in position of contactor points 87 and 87' do not affect the resistance in the measuring cell circuit in which the resistors 88 and 91 are in series. However, in order to provide for a third graduation, e. g. a one-tenth ohm variation in the compensating cell circuit, I provide a resistor 90 in the compensating cell circuit in series with and interposed between the resistances 88 and 91. This third resistor 90 is varied by moving the contact point 89 along the resistor. The variation in this resistance is made by manipulating knob C of the panel and its corresponding movable contact 89. This movement varies the resistance in both cells circuits. In order, however, to retain the resistance at constant value in the measuring cell circuit, I provide the resistor E which is like resistor 90 but disposed so that it will be opposite in effect to resistor 90. A manipulator interconnected with contacts 89 and 89' moves the contact point 89' on the resistor E and adds as much resistance in series in the measuring cell circuit as the movement of the contactor 89 on resistor 90 takes out this circuit. The subsequent balance of the galvanometer is therefore not affected by a change of resistance in the measuring cell circuit when the refined adjustments are made.

Figure 8:
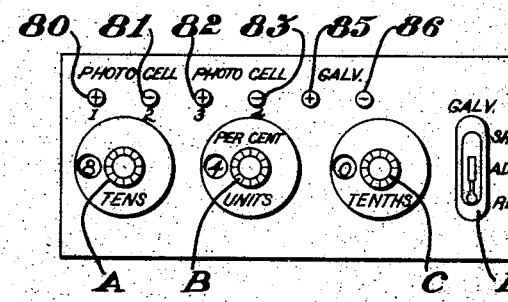
Fig. 8 is a plan view of the panel of the circuit control or decade control unit used in connection with the circuit shown in Fig. 7.
Figure 9:
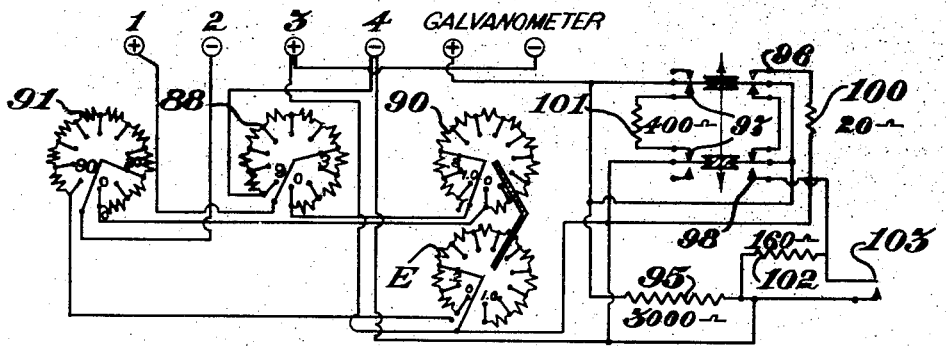
Fig. 9 is a wiring diagram of the decade resistance unit used for operating the circuit illustrated.

A circuit is provided to promote and vary the sensitiveness of the galvanometer reading and to protect the galvanometer. For this purpose, the resistor 95 is permanently connected in series with the galvanometer G in all three connections which are made by the switch D (indicated in Fig. 8 as "shunt," "adjust" and "read"). These three positions of the switch D close various circuits through contact points 96, 97 and 98, respectively. In the shunt position of switch D, the circuit from line 83 comprises binding post 4, resistor 95, contact point 99, switch D, contact point 96 and the shunt resistor 100 around the galvanometer G. Thence the circuit of the measuring cell is closed through contact point 89' and includes resistors E, 91, 90, contact point 89 and resistor 88. In the "adjust" position of the switch D the contact point 97 is contacted instead of contact point 96 and resistor 101 is substituted in the circuit for resistor 100. In the "read" position of the switch D, a different kind of connection is made. In this position, switch D makes contact with contact point 98 and brings resistor 102 between the switch D and the line so that it is in parallel with resistor 95 and in series with the galvanometer G. Resistor 102 is a very small value of resistance and this connection gives the minimum of protection and greater sensitivity of reading to the galvanometer. Still greater sensitivity can be introduced by closing an auxiliary switch 103, thereby forming a connection through line 104 without inserted resistance between the line and galvanometer, said connection being in parallel with resistors 95 and 102. This auxiliary switch 103 is indicated in the panel arrangement (Fig. 9) and it may be located on the panel upon which switch D is mounted at any convenient point. Suggestive relative values for the resistors 95, 100, 101 and 102 are indicated in Fig. 9. These values are suggested for use with a zero center D. C. high sensitivity galvanometer having a resistance of 40 ohms, a sensitivity per millimeter division of 0.01 microampere, and an external critical damping resistance of 225 ohms. Such apparratus is suitable for use with barrier layer type photoelectric cells, such as those comprising selenium (on iron) barrier construction.

In making a measurement of light distribution with the parts of the device in proper adjustment, a suitable standard, say a black polished plate glass, is placed in position over the aperture 7. The decade dials are then set at the values thereof which are selected to represent the standard. With the receptor and collimator set at the optimum angle with respect to the surface being tested, as indicated by the arcuate scales in the front of the casing 30, the shutter over the compensating cell is adjusted to give a zero deflection on the galvanometer G. The value of reflectance given to the glass plate may be arbitrary, or it may be expressed in terms of some hypothetical standard, such as a perfect mirror.

The receptor arm is then set at various angles from a position adjacent to the collimator arm to a position as far removed as possible from it. The steps or angular positions, which can readily be determined empirically, should be sufficiently small to furnish adequate data from which an accurate angular distribution curve may be plotted. At each of the receptor settings, the decade dials are readjusted to bring the galvanometer to zero. Depending upon the purpose of the operator, the whole or only a portion of the distribution curve may be determined in this way. The resultant readings of the dials are used in plotting the distribution curve of the reflected light.

For a relative brightness measurement the standard setting for the collimator is 45° and for the receptor 0° or vice versa. This measurement may be made by replacing the standard black glass with a plain magnesium oxide surface or other standard. The receptor slide may be removed when making this measurement in order to admit more light from the receptor to the measuring cell. This greatly increases the sensitivity of the instrument in making this measurement for angles close to the normal (when the receptor or collimator is set at or near this position), without impairing the accuracy of the instrument, since it provides a more uniform distribution of reflected light for angles close to the normal. However, the aperture is desirably sufficiently restricted even at this angular disposition of the parts to preclude the measurement of specularly reflected light. For opaque materials, a suggested standard setting for the collimator is 45° and for the receptor 0°.

The decade dials are then set at the values thereof which are selected to represent the standard of relative brightness, and the galvanometer reading is then brought to zero by adjusting the shutters over the compensating photoelectric cell in the manner heretofore described. With the instrument thus set for the standard of relative brightness, this standard sample is replaced by the sample to be compared therewith, and the galvanometer reading is again brought to zero by manipulation of the decade resistance unit. The difference between the readings of the latter setting of the dials and those obtained with the standard in place represents the difference in relative brightness. From a knowledge of the absolute brightness of the standard, these values can be converted to absolute brightness by an obvious simple calculation.

By variously manipulating the instrument and by variously equipping the receptor with suitable arrangements between the rear of the receptor and the measuring cell, a variety of light measurements or comparisons with given standards can be made and given relative numerical values by means of the described balancing device, such as measurements for hiding power and color measurements of transparent or opaque materials.

It is further evident that the balancing device is useful for balancing the outputs of other current output devices besides photoelectric cells, and since it is evident that widely different embodiments of this invention may be made without departing from the spirit and scope thereof, it is to be understood that the invention is not limited to the specific embodiments thereof which are hereinbefore set forth, except as defined in the appended claims.

I claim:

1. A device comprising a compensating photoelectric cell having its output terminals connected in a circuit comprising three resistance elements which are connected in series, independently movable contact members in said circuit contacting the end members and bridging the intermediate resistance element of said series of resistance elements for varying the resistance in said circuit, a measuring photoelectric cell, a circuit connecting the terminals of said cell in which the output terminals of said measuring cell are connected oppositely to the terminals of said compensating cell, said measuring cell circuit including the three resistance elements of said compensating cell circuit and a fourth resistance element external to said first named resistances, all four of said resistances being connected in series in said measuring cell circuit, a contact member in said measuring cell circuit movable along said intermediate resistance element for varying the resistance in the circuit, another movable contact member in said measuring cell circuit contacting along said fourth resistance element for varying the resistance in the same circuit, and means interconnecting said last named variable contact members for disposing one member which contacts with said fourth resistance element so that the resistance in the circuit will be varied in opposite effect as the resistance in said measuring cell circuit is varied by the movement of the other contact member which is in contact with said intermediate resistance.

2. A device in accordance with claim 1 which comprises a galvanometer and connections in said measuring photoelectric cell circuit in parallel with said measuring cell, said connection being made between said cell and said four resistance elements.

3. A device in accordance with claim 1 which comprises a galvanometer and connections in said measuring circuit in parallel with said measuring photoelectric cell, said connections being between said cell and said four resistance elements, said galvanometer connections comprising a permanently connected resistor in series with the galvanometer and in parallel with said photoelectric cell, a second resistor, means for connecting said second resistor in the galvanometer circuit in parallel with the galvanometer and in series with the first said resistor, another resistor, means for substituting the same for said second resistor in parallel with the first resistor and in series with the galvanometer.

4. A device in accordance with claim 1 which comprises a galvanometer and connections in said measuring photoelectric cell circuit in parallel with the measuring photoelectric cell, said connections being between said cell and said four resistance elements, said galvanometer connections comprising a permanently connected resistor in series with the galvanometer and in parallel with the cell, and means for connecting the galvanometer directly across said measuring cell circuit.

5. A circuit comprising a compensating photoelectric cell disposed to reeceive light directly from a light source of constant value, a measuring photoelectric cell disposed to receive a variable quantity of light, output terminals on said cells, conductors including two compensating variable resistances and a third variable resistance in series with said compensating cell, conductors including all of said resistances and a further variable resistance in series with said measuring cell, the output of said measuring cell being opposed to the output of said compensating cell, means for varying the resistance in the compensating cell circuit for balancing the compensating cell against the measuring cell when the output of said measuring cell is varied from a predetermined standard value by a variation in recepted light transmitted to the cell, and means for varying said fourth resistance inversely as the resistance in said third resistance is varied for maintaining the total resistance in the external circuit of the measuring cell at a constant value.

WILLIAM E. SCOTT.

REFERENCES CITED

The following references are of record in the file of this patent:

UNITED STATES PATENTS

| Number | Name | Date |
|---|---|---|
| 2,064,517 | Brice | Dec. 15, 1936 |
| 2,178,211 | Nolan | Oct. 31, 1939 |
| 2,215,211 | Devol | Sept. 17, 1940 |
| 2,263,938 | West | Nov. 25, 1941 |

Certificate of Correction

Patent No. 2,463,321. March 1, 1949.

WILLIAM EDWIN SCOTT

It is hereby certified that errors appear in the printed specification of the above numbered patent requiring correction as follows:

Column 3, line 14, strike out the word "view"; column 4, line 16, before the word "edge" insert *arcuate*; column 7, line 17, for "point 87" read *point 87'*; line 40, after "out" insert *of*;

and that the said Letters Patent should be read with these corrections therein that the same may conform to the record of the case in the Patent Office.

Signed and sealed this 5th day of July, A. D. 1949.

[SEAL]

THOMAS F. MURPHY,
*Assistant Commissioner of Patents.*